United States Patent
Kobayashi et al.

(10) Patent No.: US 9,922,401 B2
(45) Date of Patent: Mar. 20, 2018

(54) IMAGE PROCESSING DEVICE AND IMAGE PROCESSING METHOD

(71) Applicant: NEC Corporation, Minato-ku, Tokyo (JP)

(72) Inventors: Eita Kobayashi, Tokyo (JP); Takashi Takenaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 76 days.

(21) Appl. No.: 14/426,860

(22) PCT Filed: Sep. 10, 2013

(86) PCT No.: PCT/JP2013/074393
§ 371 (c)(1),
(2) Date: Mar. 9, 2015

(87) PCT Pub. No.: WO2014/042155
PCT Pub. Date: Mar. 20, 2014

(65) Prior Publication Data
US 2016/0260200 A1 Sep. 8, 2016

(30) Foreign Application Priority Data
Sep. 11, 2012 (JP) ................................. 2012-199282

(51) Int. Cl.
*G06K 9/40* (2006.01)
*G06T 5/00* (2006.01)
(Continued)

(52) U.S. Cl.
CPC ............... *G06T 5/002* (2013.01); *G06T 5/10* (2013.01); *G06T 2207/20016* (2013.01); *G06T 2207/20064* (2013.01); *H04N 1/409* (2013.01)

(58) Field of Classification Search
USPC ........ 382/275, 276, 263, 264, 254, 260; 1/1;
250/208.1; 348/242, 249, E9.01;
(Continued)

(56) References Cited

U.S. PATENT DOCUMENTS 6,771,793 B1 8/2004 Yamada
8,951,218 B2* 2/2015 Hardert ............ A61M 25/0026
604/4.01
(Continued)

FOREIGN PATENT DOCUMENTS

EP 1865460 A1 12/2007
EP 1980956 A1 10/2008
(Continued)

OTHER PUBLICATIONS

International Search Report for PCT Application No. PCT/JP2013/074393, mailed on Nov. 19, 2013.
(Continued)

*Primary Examiner* — Anh Do

(57) ABSTRACT

Provided is an image processing device for performing noise removal in which a plurality of noise removal actions are combined while minimizing necessary resources. The image processing device is provided with: a first frequency separation unit for separating the input image by frequency into a first low-frequency component and a first high-frequency component containing a higher-frequency component than the first low-frequency component; a second frequency separation unit for separating the first low-frequency component into a second low-frequency component and a second high-frequency component containing a higher-frequency component than the second low-frequency component; a first image transform unit for performing noise removal on the second low-frequency component and the second high-frequency component and outputting the noise-removed image as a first transformed image; and a second
(Continued)

image transform unit for performing noise removal on the first high-frequency component and the first transformed image with less resources being allocated than those allocated to the first image transform unit, and outputting the noise-removed image as a second transformed image.

7 Claims, 8 Drawing Sheets

(51) Int. Cl.
 *G06T 5/10* (2006.01)
 *H04N 1/409* (2006.01)
(58) Field of Classification Search
 USPC .............................................. 362/317; 439/39
 See application file for complete search history.

(56) References Cited

U.S. PATENT DOCUMENTS

| | | | | |
|---|---|---|---|---|
| 8,956,349 | B2 * | 2/2015 | Aldridge | A61B 17/320092 606/34 |
| 9,039,695 | B2 * | 5/2015 | Giordano | A61B 17/320092 606/34 |
| 9,060,775 | B2 * | 6/2015 | Wiener | A61B 17/320092 |
| 9,060,776 | B2 * | 6/2015 | Yates | A61B 17/320092 |
| 9,168,054 | B2 * | 10/2015 | Turner | A61B 17/320092 |
| 2004/0213477 | A1 * | 10/2004 | Nakajima | G06T 5/002 382/254 |
| 2010/0286525 | A1 | 11/2010 | Osumi | |

FOREIGN PATENT DOCUMENTS

| | | |
|---|---|---|
| JP | 7-107480 A | 4/1995 |
| JP | 9-181612 A | 7/1997 |
| JP | 3263535 B | 12/2001 |
| JP | 2007-188211 A | 7/2007 |
| JP | 2007-316983 A | 12/2007 |
| JP | 2008-015741 A | 1/2008 |
| JP | 2008-211627 A | 9/2008 |
| JP | 2009-098742 A | 5/2009 |
| JP | 2009-219066 A | 9/2009 |
| JP | 2010-252396 A | 11/2010 |

OTHER PUBLICATIONS

Carletta J. et al., "Design of a field programmable gate array-based platform for real-time de-noising of optical imaging signal using wavelet transforms", Measurement, Institute of Measurement and Control, London, GB, vol. 36, No. 3-4, Oct. 1, 2004, pp. 289-296, XP004633241.

Extended European Search Report for EP Application No. EP13838013.4 dated Apr. 28, 2016.

Communication dated Jan. 24, 2018, issued by the European Patent Office in counterpart European Application No. 13838013.4-1210.

* cited by examiner

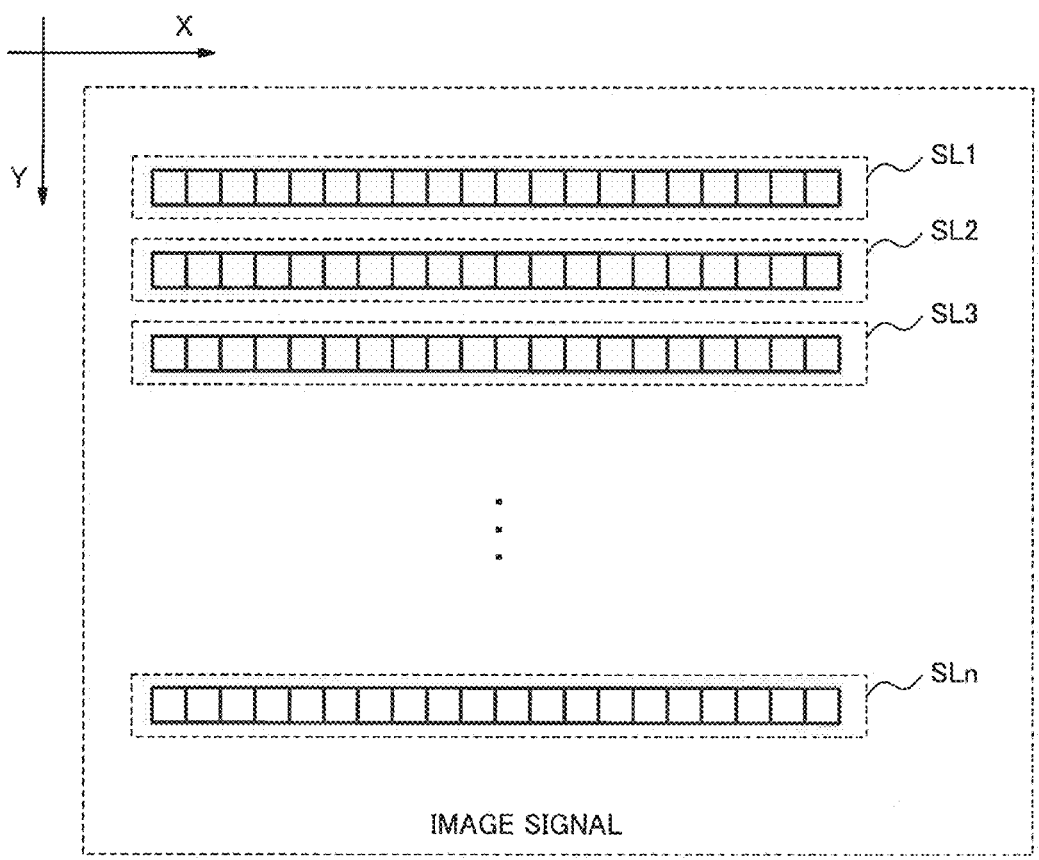

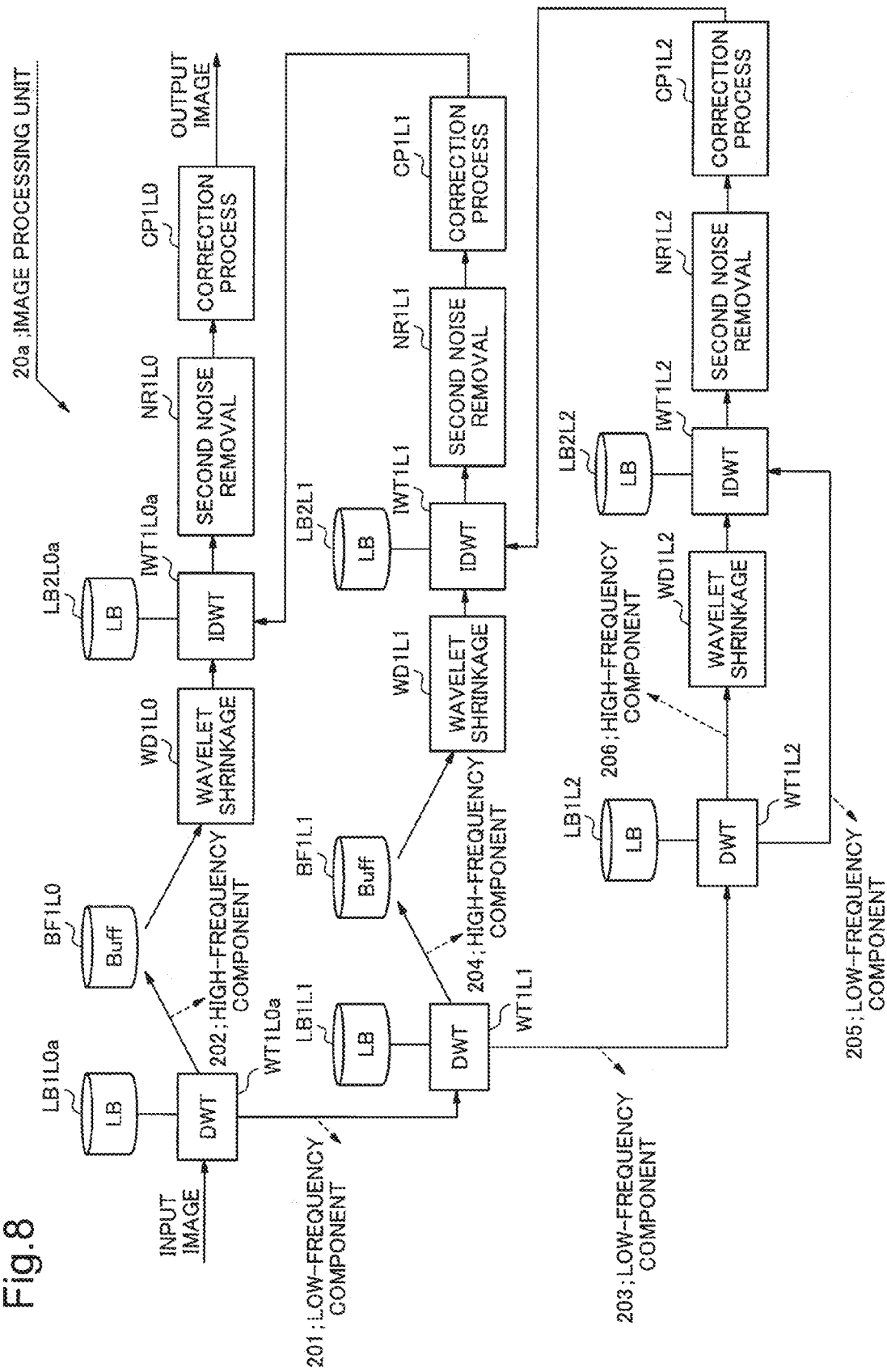

IMAGE PROCESSING DEVICE AND IMAGE PROCESSING METHOD

CROSS-REFERENCE TO RELATED APPLICATION

This application is a National Stage Entry of PCT/JP2013/074393 filed on Sep. 10, 2013, which claims priority from Japanese Patent Application 2012-199282 filed on Sep. 11, 2012, the contents of all of which are incorporated herein by reference, in their entirety.

The present invention is based on Japanese Patent Application No. 2012-199282 (filed on Sep. 11, 2012), the entire content of which is herein incorporated by reference.

TECHNICAL FIELD

The present invention relates to an image processing device and an image processing method. In particular, the present invention relates to an image processing device and an image processing method which remove noise from an image signal.

BACKGROUND ART

The widespread high-performance image sensors including charge coupled device (CCD) sensors have caused an increased need for techniques to remove noise from image signals. An image sensor having higher pixel count causes electric currents flowing between adjacent pixels to affect one another, contributing to generation of noise. On the other hand, images captured by high pixel-count image sensors are steadily growing in data size. Raw image data is not suitable to be processed, and thus image signals are compressed. However, a compression process can generate some noise such as what is called mosquito noise or block noise.

PTL 1 discloses an image processing device which carries out coring processing to reduce noise while suppressing blurred edges and phase shifting caused by the coring. PTL 2 discloses an image processing device which enables to reduce noise in a whole image including edges and their surrounding areas while preventing edges from blurring in an image. PTL 3 discloses an image processing device which enables to remove noise while reducing blurred edges caused by coring processing. PTL 4 discloses an image processing device which achieves an inexpensive noise removing circuit with the circuit scale largely reduced while providing optimum noise reduction with respect to luminance and color difference respectively.

In addition, PTL 5 discloses total variation (TV) denoising. TV denoising is a technique to remove noise by using color information in surrounding pixels while preserving edge components.

CITATION LIST

Patent Literature

PTL 1: Japanese Unexamined Patent Application Publication No. 2007-188211
PTL 2: Japanese Unexamined Patent Application Publication No. 2009-219066
PTL 3: Japanese Unexamined Patent Application Publication No. 2007-316983
PTL 4: Japanese Unexamined Patent Application Publication No. 2008-211627
PTL 5: Japanese Patent No. 3263535

SUMMARY OF INVENTION

Technical Problem

The respective disclosures of the related literatures given above are incorporated by reference herein. The following analysis is made from viewpoints of the present invention.

As described above, a plurality of techniques are available to remove noise from image signals. However, none of these noise removal processes is perfect (not capable of removing all noise). For example, noise removal through wavelet shrinkage enables to remove low-frequency noise through a multi-resolution analysis where a plurality of wavelet transforms are carried out. However, noise removal through wavelet shrinkage may often cause blurred edges or artifacts such as block noise in an image which has undergone noise removal.

TV denoising achieves noise removal while preserving edges by separating an image signal into edge and texture components. However, TV denoising may fail to remove low-frequency noise that can be removed by wavelet shrinkage, or may erase information on texture along with noise.

As seen above, noise removal processing involves both advantages and disadvantages. A possible solution would be combining a plurality of noise removal processes so as to remove noise effectively and at the same time to compensate for disadvantages of the individual noise removal processes. A combination of a plurality of noise removal processes will be described later in detail.

Combining a plurality of noise removal processes can enhance the effect of noise removal. However, due to various constraints, it is difficult to implement the combination of noise removal processes with a central processing unit (CPU) caused to execute a program. For example, an algorithm combining a plurality of noise removal processes is very complicated, and a program implementing such complicated algorithm will be executed by a CPU at a limited speed.

In addition, large capacity memory is required for executing a complicated algorithm. In other words, a huge amount of resources will be needed to cause a CPU to execute a program in order to implement a plurality of noise removal processes involving a complicated algorithm. Accordingly, it is desirable to provide an image processing device that enables to remove noise with a combination of a plurality of noise removal processes while minimizing necessary resources. It should be noted that none of the techniques disclosed in PTL 1 to 5 makes it possible to combine a plurality of noise removal processes while minimizing necessary resources.

Solution to Problem

According to a first aspect of the present invention, there is provided an image processing device including: a first frequency separation unit which receives an input image and performs frequency separation on the input image into a first low-frequency component and a first high-frequency component that includes a higher-frequency component than the first low-frequency component; a second frequency separation unit which separates the first low-frequency component into a second low-frequency component and a second high-frequency component that includes a higher-frequency component than the second low-frequency component; a first image transform unit which performs noise removal on the second low-frequency component and on the second high-frequency component, and outputs a noise-removed image as a first transformed image; and a second image transform unit which performs noise removal on the first high-frequency component and on the first transformed image, with fewer resources allocated than those allocated to the first image transform unit, and outputs a noise-removed image as a second transformed image.

According to a second aspect of the present invention, there is provided a method for processing an image, the method including: a first frequency separation step of receiving an input image and performing frequency separation on the input image into a first low-frequency component and a first high-frequency component which includes a higher-frequency component than the first low-frequency component; a second frequency separation step of separating the first low-frequency component into a second low-frequency component and a second high-frequency component which includes a higher-frequency component than the second low-frequency component; a first image transform step of outputting a first transformed image by performing noise removal on the second low-frequency component and on the second high-frequency component; and a second image transform step of outputting a second transformed image by performing noise removal on the first high-frequency component and on the first transformed image with resources fewer than those used for the first image transform step.

Advantageous Effects of Invention

According to the respective aspects of the present invention, there is provided an image processing device that performs noise removal with a combination of a plurality of noise removal processes while minimizing necessary resources.

BRIEF DESCRIPTION OF DRAWINGS

FIG. 7 illustrates an example of an arrangement of an input image.

FIG. 8 illustrates an example of an internal configuration of an image processing unit 20a according to a first exemplary embodiment.

DESCRIPTION OF EMBODIMENTS

Figure 1:
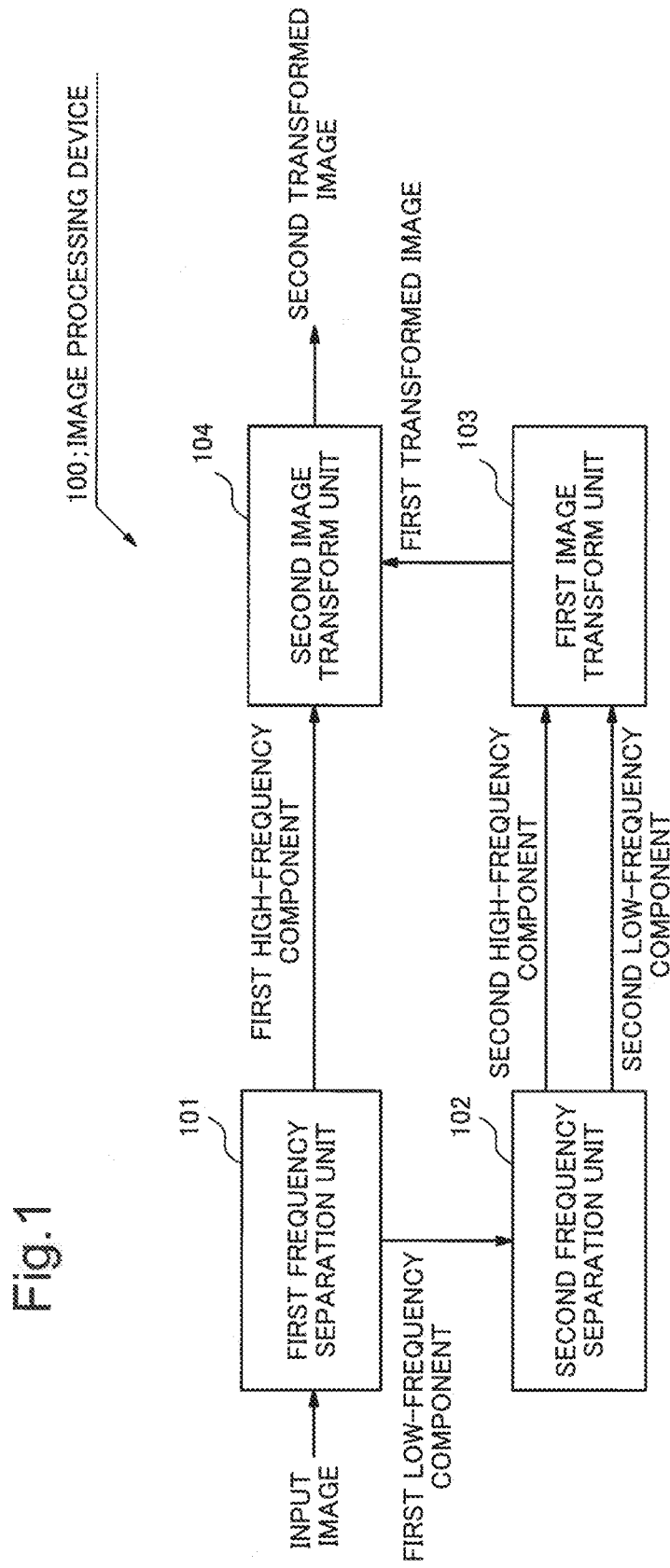
FIG. 1 illustrates an overview of an exemplary embodiment.

In the first place, an exemplary embodiment is outlined with reference to FIG. 1. It should be noted that reference symbols in the drawing for this outline are added for convenience to respective elements by way of example in order to aid understanding, and are not intended to limit the present invention to the mode illustrated in the drawing.

As described above, combining a plurality of noise removal processes would result in a very complicated algorithm. A lot of resources are required to carry out such a complicated algorithm. Thus, it is desirable to provide an image processing device which enables to remove noise with a combination of a plurality of noise removal processes while minimizing necessary resources.

To fulfill this desire, an image processing device 100 illustrated in FIG. 1 is provided as an example. The image processing device 100 in FIG. 1 includes a first frequency separation unit 101, a second frequency separation unit 102, a first image transform unit 103, and a second image transform unit 104. The first frequency separation unit 101 receives an input image, and performs frequency separation on the input image into a first low-frequency component and a first high-frequency component that includes a higher-frequency component than the first low-frequency component. The second frequency separation unit 102 separates the first low-frequency component into a second low-frequency component and a second high-frequency component that includes a higher-frequency component than the second low-frequency component. The first image transform unit 103 performs noise removal on the second low-frequency component and on the second high-frequency component, and outputs a noise-removed image as a first transformed image. The second image transform unit 104 performs noise removal on the first high-frequency component and on the first transformed image with fewer resources allocated than those allocated to the first image transform unit 103, and outputs a noise-removed image as a second transformed image.

The first frequency separation unit 101 separates an input image into a low-frequency component and a high-frequency component. The second frequency separation unit 102 receives the resulting low-frequency component of the separation performed by the first frequency separation unit 101, and then further separates this low-frequency component into a low-frequency component and a high-frequency component. The first image transform unit 103 performs noise removal on the low-frequency component and the high-frequency component, both of which are output from the second frequency separation unit 102. More specifically, the first image transform unit 103 performs noise removal through wavelet shrinkage or the like.

It should be noted that the transformed image that is output from the first image transform unit 103 is the result of noise removal performed on the first low-frequency component. Thus, the first transformed image and the first high-frequency component are reconstructed into an image which reflects the noise removal performed in the first image transform unit 103. The second image transform unit 104 further performs noise removal on the first high-frequency component and on the first transformed image. The noise removal carried out by the second image transform unit 104 need not be the same as that performed by the first image transform unit 103.

As described above, the second image transform unit 104 uses the first transformed image which reflects the noise removal performed in the first image transform unit 103. In other words, the noise removal in the first image transform unit 103 exerts a greater impact on the whole image (a second transformed image). On the other hand, the noise removal in the second image transform unit 104 does not affect other noise removal processes. In other words, the noise removal performed in the second image transform unit 104 exerts less impact on the whole image than the noise removal performed in the first image transform unit 103.

Thus, resources required for the second image transform unit 104 are reduced through simplified operations in the second image transform unit 104.

Consequently, there can be provided an image processing device that performs noise removal with a combination of a plurality of noise removal processes while necessary resources are minimized.

Possible modes are described below.

[Mode 1] As in the image processing device according to the first aspect above.

[Mode 2] The first frequency separation unit preferably includes a first wavelet transform unit which performs a wavelet transform, whereas the second frequency separation unit preferably includes a second wavelet transform unit which performs a wavelet transform.

[Mode 3] The first image transform unit preferably includes a first wavelet shrinkage unit and a first inverse wavelet transform unit. The first wavelet shrinkage unit compares a wavelet coefficient for the second high-frequency component with a first threshold value, and shrinks any wavelet coefficient that is smaller than the first threshold value. The first inverse wavelet transform unit reconstructs an image by performing an inverse wavelet transform on the signal which is output from the first wavelet shrinkage unit and on the second low-frequency component. The second image transform unit preferably includes a second wavelet shrinkage unit and a second inverse wavelet transform unit. The second wavelet shrinkage unit compares a wavelet coefficient for the first high-frequency component with a second threshold value, and shrinks any wavelet coefficient that is smaller than the second threshold value. The second inverse wavelet transform unit reconstructs an image by performing an inverse wavelet transform on the signal which is output from the second wavelet shrinkage unit and on the first transformed image.

[Mode 4] Preferably, a first basis function employed in the first wavelet transform unit and the first inverse wavelet transform unit is different from a second basis function employed in the second wavelet transform unit and the second inverse wavelet transform unit.

[Mode 5] Preferably, the first wavelet transform unit, the first inverse wavelet transform unit, the second wavelet transform unit, and the second inverse wavelet transform unit each include a line buffer to store pixels of the input image in a scanning direction. Furthermore, a first line buffer included in each of the first wavelet transform unit and the first inverse wavelet transform unit is preferably smaller, in terms of the number of lines, than a second line buffer included in each of the second wavelet transform unit and the second inverse wavelet transform unit.

[Mode 6] The first and/or second image transform unit preferably includes an image correction unit which performs image correction on a noise-removed image.

[Mode 7] Preferably, a pipeline architecture is configured by the first wavelet transform unit, the first wavelet shrinkage unit, the first inverse wavelet transform unit, the second wavelet transform unit, the second wavelet shrinkage unit, and the second inverse wavelet transform unit.

[Mode 8] As in the image processing device according to the second aspect.

Image processing with a combination of a plurality of noise removal processes will now be described.

Figure 2:
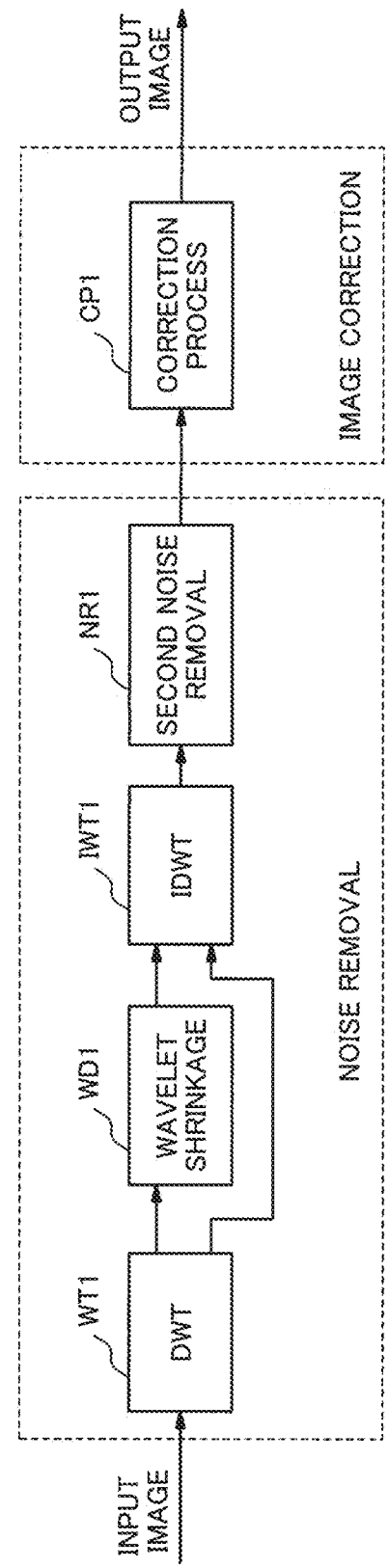
FIG. 2 illustrates an example of a method for processing images.

FIG. 2 illustrates an example of a method for processing an image.

The image processing method illustrated in FIG. 2 is configured by noise removal and image correction.

The image processing method illustrated in FIG. 2 mitigates adverse effect of noise removal and improves image quality by denoising an input image signal through a noise removal process and then correcting the noise-removed image.

The noise removal process will now be described in detail.

The noise removal process includes discrete wavelet transform WT1, wavelet shrinkage WD1, inverse discrete wavelet transform IWT1, and second noise removal NR1. In FIG. 2 and the subsequent drawings, the discrete wavelet transform is denoted as "DWT", the wavelet as "Wavelet", and the inverse discrete wavelet transform as "IDWT."

Figure 3:
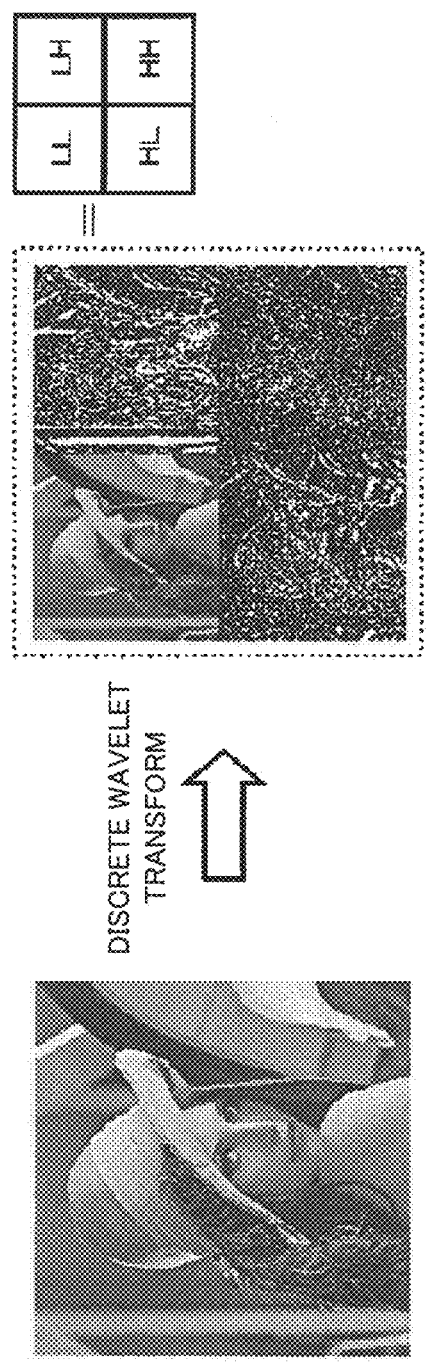
FIG. 3 illustrates an example of a result of a discrete wavelet transform performed on an input image.

The discrete wavelet transform WT1 performs a discrete wavelet transform on an input image in the horizontal (scanning line) and vertical directions. FIG. 3 illustrates an example of a result of a discrete wavelet transform performed on an input image. The discrete wavelet transform performed on the input image on the left side of FIG. 3 causes the input image to be separated into four sub-bands based on frequencies. In other words, the input image is separated into four sub-bands in the vertical and horizontal directions each including high-frequency and low-frequency components. The upper left sub-band in FIG. 3 contains horizontal and vertical low-frequency components. Likewise, the lower left sub-band contains a horizontal low-frequency component and a vertical high-frequency component, the upper right sub-band contains a horizontal high-frequency component and a vertical low-frequency component, and the lower right sub-band contains horizontal and vertical high-frequency components.

The wavelet shrinkage WD1 removes noise from the sub-band containing high-frequency components among the four sub-bands obtained through a discrete wavelet transform performed on an input image. The wavelet shrinkage WD1 removes noise by comparing wavelet coefficients of the high-frequency components in the input image with a threshold value, and by regarding as noise any signal having a wavelet coefficient equal to or less than the threshold value. More specifically, WD1 performs shrinkage on the high-frequency components in the input image (sub-bands other than the upper left one) by replacing any signal having a wavelet coefficient equal to or less than the specified threshold value with 0. In this wavelet shrinkage it can be assumed that a signal inherently contained in the input image has a wavelet coefficient equal to or greater than a certain value, and that a signal having a very small coefficient is noise. The wavelet shrinkage WD1, focusing on such characteristics of signals and noise, removes noise by regarding as noise any signal having a wavelet coefficient equal to or less than a threshold value and replacing the coefficient with 0.

The inverse discrete wavelet transform IWT1 reconstructs an image signal from the low-frequency component produced by the discrete wavelet transform WT1 by separation, and from the high-frequency component which has undergone the wavelet shrinkage WD1.

The second noise removal NR1 has a function to complement the noise removal performed by the wavelet shrinkage WD1 or to remove noise caused by the discrete wavelet transform WT1. For the second noise removal NR1, mean filtering, median filtering, or any other noise removal filtering that does not involve wavelet transforms can be used. However, these processes are not intended to limit the second noise removal process NR1, which may be any process that complements the noise removal performed by the wavelet shrinkage WD1 or removes noise caused by the discrete wavelet transform WT1. For example, a noise removal process such as TV regularization may be performed at the second noise removal process NR1. TV regularization is a noise removal process allowing noise removal from an image signal while preserving edge components inherent in the input image. More specifically, TV regularization is a process used to separate color information contained in surrounding pixels into an edge component and a texture component and thereby to weaken noise content in the texture component while preserving the edge component.

Image corrections are made in the correction process CP1 illustrated in FIG. 2. The correction process CP1 preferably restores edges by writing back edges or performs a sharpening process such as edge enhancement. The correction process may also make coloring corrections such as white balance or tone balance correction. The correction process CP1 corrects a noise-removed image by using one of, or any combination of, edge treatment, sharpening, coloring correction, and the like. However, these processes are not intended to limit a process performed in the correction process CP1.

The image processing method illustrated in FIG. 2 enhances the effect of noise removal by applying a plurality of noise removal processes to an input image as well as mitigates an adverse effect on the image caused by such noise removal by making image corrections. The following configuration can further improve the effectiveness of noise removal.

Figure 4:
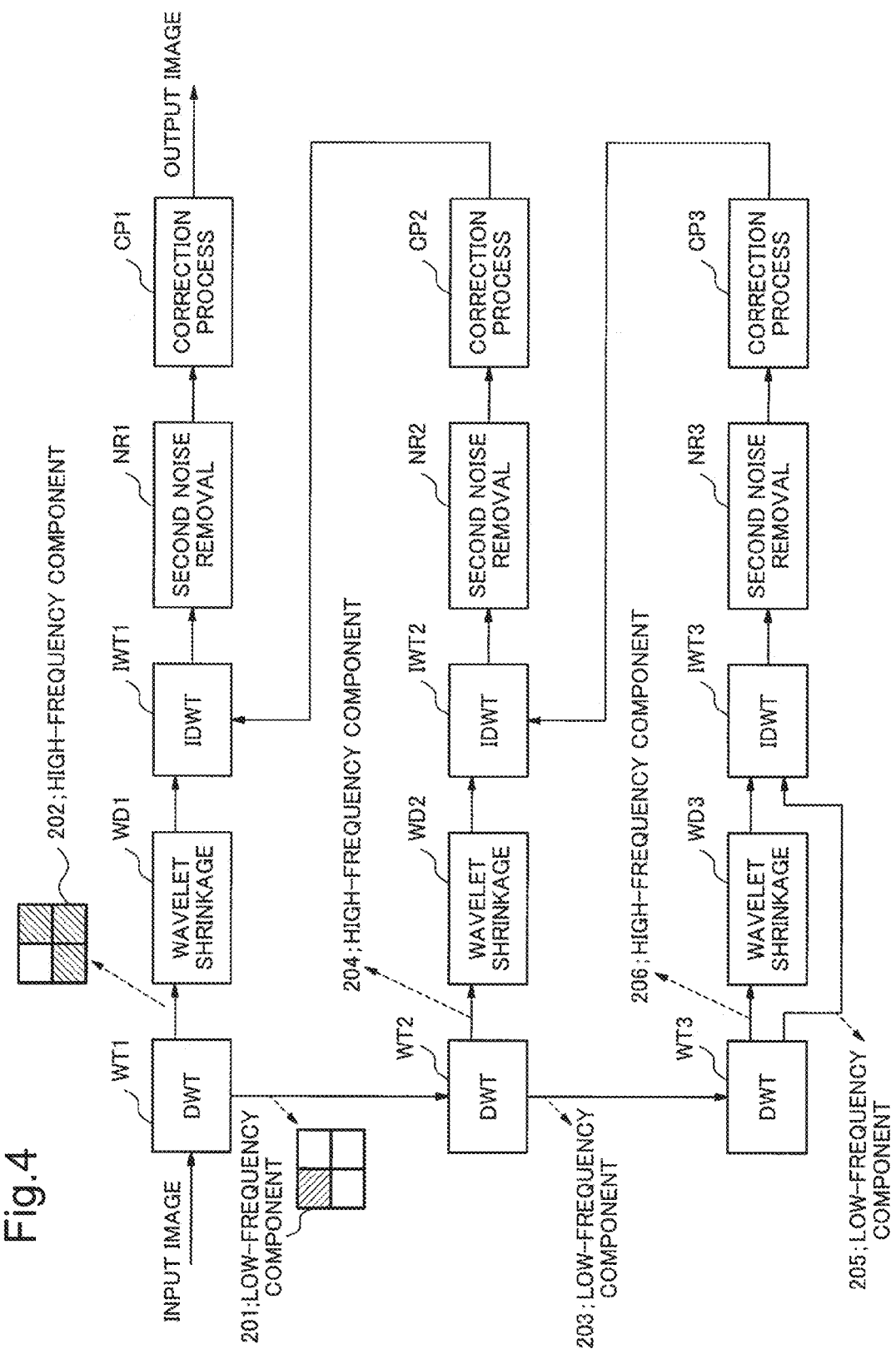
FIG. 4 illustrates an example of a method for processing images.

FIG. 4 illustrates an example of a method for processing an image. In FIG. 4, identical reference symbols are used for identical elements as in FIG. 2 and explanations for these symbols are omitted.

The image processing method illustrated in FIG. 4 allows a lower-frequency component to be extracted through a plurality of repetitive discrete wavelet transforms. The extracted low-frequency component undergoes a series of noise removal and image correction processes. For this purpose, the image processing method illustrated in FIG. 4 adds discrete wavelet transforms WT2 and WT3 to extract a low-frequency component. Note that in FIG. 4 the low-frequency component among sub-bands produced through frequency separation is shaded with sloped lines running toward lower left. The high-frequency components among sub-bands produced through frequency separation are shaded with sloped lines running toward lower right. Extracted low-frequency components each undergo a series of noise removal (wavelet shrinkage, second noise removal) and image correction (correction process) processes. As a result, images of higher quality can be obtained.

Operations of the image processing method illustrated in FIG. 4 will now be described.

The discrete wavelet transform WT1 receives an input image. The discrete wavelet transform WT1 separates the input image into four sub-bands. The four sub-bands produced through separation by the discrete wavelet transform WT1 are assumed to be in the layer L0.

The discrete wavelet transform WT2 separates the sub-band containing a low-frequency component 201, which is one of the sub-bands produced through separation, into four sub-bands. The four sub-bands produced through separation by the discrete wavelet transform WT2 are assumed to be in the layer L1.

The discrete wavelet transform WT3 further separates the sub-band containing a low-frequency component 203 of the layer L1 into four sub-bands. The four sub-bands produced through separation by the discrete wavelet transform WT3 are assumed to be in the layer L2.

In this way, the image processing method illustrated in FIG. 4 uses a plurality of discrete wavelet transforms (three transforms in FIG. 4) performed on the input image to extract a low-frequency component. After the plurality of discrete wavelet transforms, the wavelet shrinkage WD3 is applied to the high-frequency component 206 of the layer L2. Then, the inverse discrete wavelet transform IWT3 reconstructs an image from the layer L2 high-frequency component 206 which has undergone the wavelet shrinkage and from the layer L2 low-frequency component 205. The reconstructed image then undergoes second noise removal NR3 and image correction (correction process CP3).

The correction process CP3 outputs the image signal (the layer L1 low-frequency component) which has undergone reconstruction in the layer L2. The inverse discrete wavelet transform IWT2 receives the layer L2 image signal which has been output from the correction process CP3. The inverse discrete wavelet transform IWT2 reconstructs an image from the layer L2 image signal and from the layer L1 high-frequency component 204 which has undergone the wavelet shrinkage WD2. Then, after the layer L1 reconstructed image is subjected to the second noise removal NR2 and the image correction (correction process CP2), the image is output from the correction process CP2.

The inverse discrete wavelet transform IWT1 reconstructs a layer L0 image signal from the layer L1 image signal (the layer L0 low-frequency component) which has been output from the correction process CP2 and from the layer L0 high-frequency component 202. After the layer L0 image signal is subjected to the second noise removal NR1 and the image correction (correction process CP1), the output image is output from the correction process CP1.

First Exemplary Embodiment

A first exemplary embodiment will now be described in detail with reference to the drawings.

Figure 5:
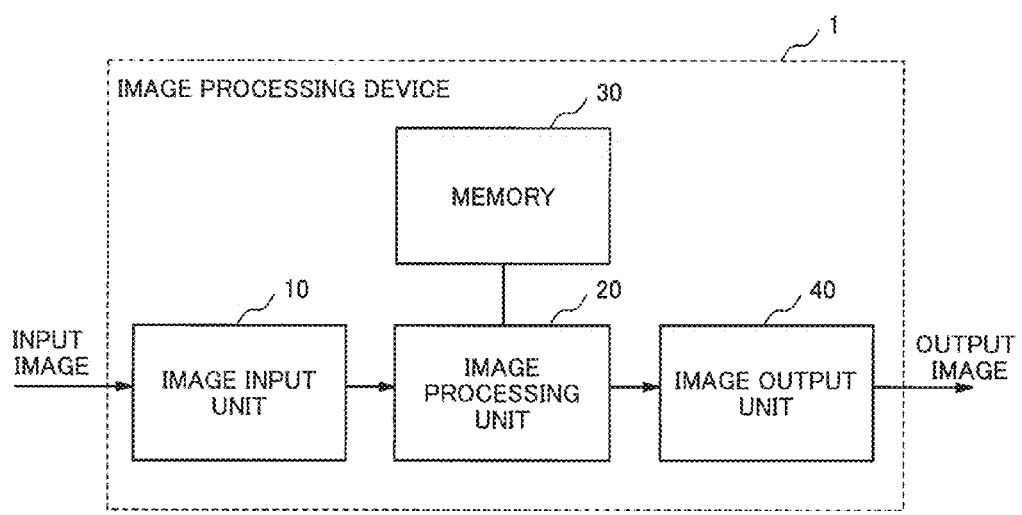
FIG. 5 illustrates an example of an internal configuration of an image processing device 1.

FIG. 5 illustrates an example of an internal configuration of an image processing device 1.

The image processing device 1 includes an image input unit 10, an image processing unit 20, memory 30, and an image output unit 40. The memory 30 is either internal memory located inside the image processing device 1 or external memory attached outside.

The image input unit 10 receives an input image from outside. The image processing unit 20 applies the imaging processing, as described above with reference to FIG. 4, to the input image which has been output from the image input unit 10. The image output unit 40 outputs the noise-removed image which has been output from the image processing unit 20.

The following describes a configuration and operations of the image processing unit 20, i.e., implementation of the image processing method illustrated in FIG. 4.

Figure 6:
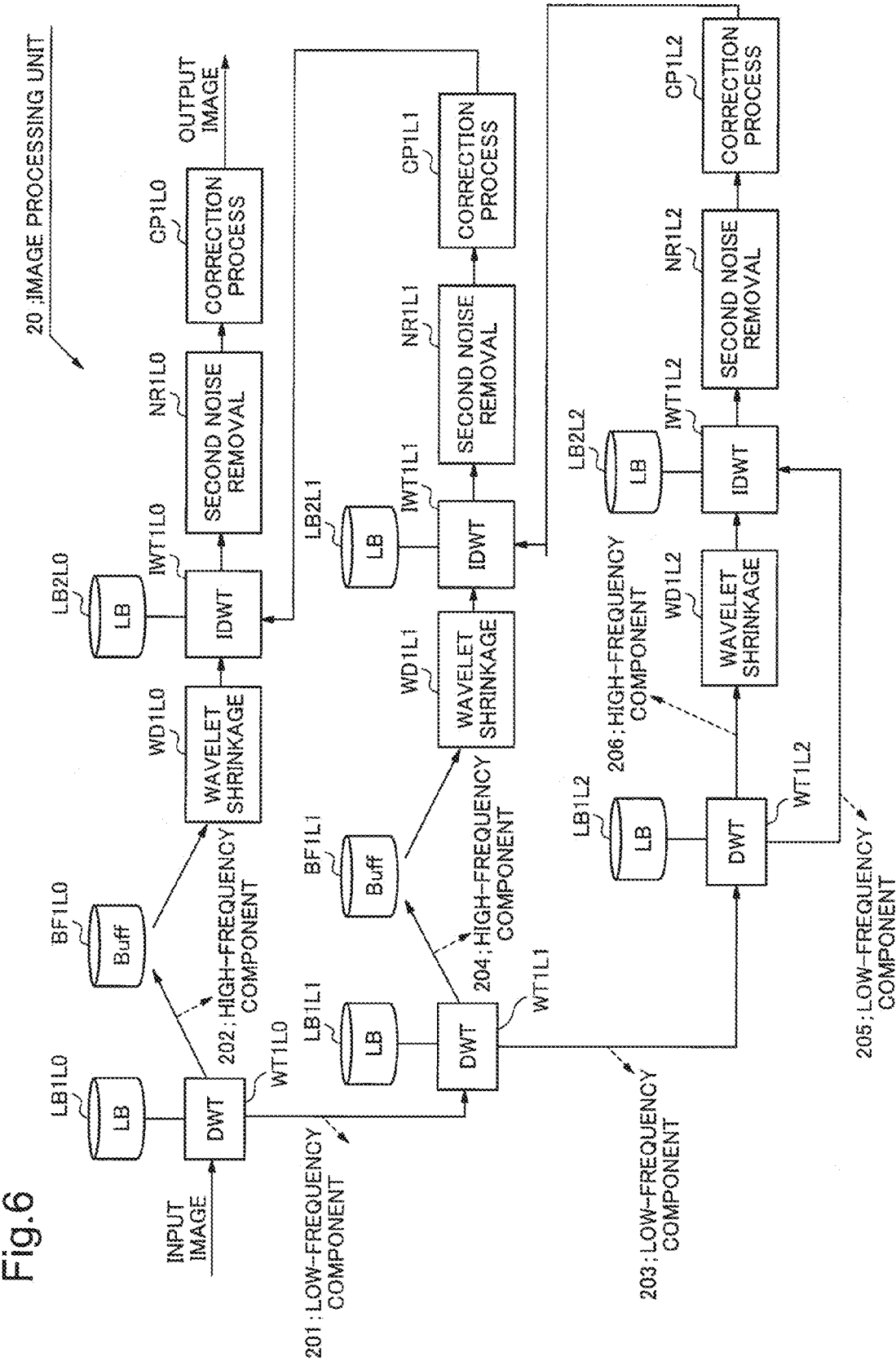
FIG. 6 illustrates an example of an internal configuration of the image processing unit 20 depicted in FIG. 5.

FIG. 6 illustrates an example of an internal configuration of the image processing unit 20.

In the image processing unit 20, noise removal and image correction are performed in each of the layers L0 to L3. These noise removal and other processes are handled in a pipeline architecture. Employing a pipeline architecture achieves high-speed processing of a complicated algorithm (a combination of a plurality of noise removal processes).

Referring to FIG. 6, noise removal and image correction in the layer L0 are achieved through a discrete wavelet transform unit WT1L0, a wavelet shrinkage unit WD1L0, an inverse discrete wavelet transform unit IWT1L0, a second noise removal unit NR1L0, and a correction unit CP1L0.

In addition, the discrete wavelet transform unit WT1LO and the inverse discrete wavelet transform unit IWT1L0 are connected to line buffers LB1L0 and LB2L0, respectively. A buffer BF1L0 temporarily stores the layer L0 high-frequency component 202, which has been produced by the discrete wavelet transform unit WT1L0 through frequency separation.

Likewise, the layer L1 image signal (i.e., the layer L0 low-frequency component) is subjected to the noise removal and image correction similarly configured to the layer L0. The layer L2 image signal is also handled in the same way as in the layers L0 and L1, with the exception that no buffer corresponding to the buffer BF1L0 or BF1L1 exists because the layer L2 high-frequency component 206 need not be temporarily stored.

Note that the discrete wavelet transform unit WT1L0 corresponds to the above-described first frequency separation unit 101 while the discrete wavelet transform unit WT1L2 corresponds to the second frequency separation unit 102. Also note that the above-described first image transform unit 103 is configured by the units: the wavelet shrinkage unit WD1L2, the inverse discrete wavelet transform unit IWT1L2, and the second noise removal unit NR1L2. Similarly, the above-described second image transform unit 104 is configured by the units: the wavelet shrinkage unit WD1L0, the inverse discrete wavelet transform unit IWT1L0, and the second noise removal process unit NR1L0. In addition, the discrete wavelet transform unit WT1L1 undertakes a role corresponding to the above second frequency separation unit 102. The wavelet shrinkage unit WD1L1, the inverse discrete wavelet transform unit IWT1L1, and the second noise removal process unit NR1L1 each undertake a role corresponding to the above first image transform unit 103. In other words, the two-layer configuration for image processing in FIG. 1 corresponds to the extended three-layer configuration for image processing in FIG. 6.

Operations of the image processing unit 20 will now be described below.

The discrete wavelet transform unit WT1L0 separates an input image into four sub-bands (low-frequency component 201 and high-frequency component 202). The discrete wavelet transform unit WT1L1 receives the layer L0 low-frequency component 201 and separates it into four sub-bands. The discrete wavelet transform unit WT1L2 receives the layer L1 low-frequency component 203 and separates it into four sub-bands. The wavelet shrinkage unit WD1L2 performs wavelet shrinkage on the layer L2 high-frequency component 206. The inverse wavelet transform unit ITW1L2 reconstructs an image from the signal that has been output from the wavelet shrinkage unit WD1L2 and from the layer L2 low-frequency component 205. The reconstructed image undergoes noise removal in the second noise removal unit NR1L2. The noise-removed image is subjected to image correction in the correction unit CP1L2, and then output to the layer L1 inverse discrete wavelet transform unit IWT1L1.

On the other hand, the high-frequency component 204, which has been produced through frequency separation by the discrete wavelet transform unit WT1L1, is temporarily stored in the buffer BF1L1. The wavelet shrinkage unit WD1L1 reads the layer L1 high-frequency component 204 from the buffer BF1L1 at the timing when the layer L2 image signal (the layer L1 low-frequency component 203) is output from the layer L2 correction unit CP1L2.

The wavelet shrinkage unit WD1L1 also performs wavelet shrinkage on the layer L1 high-frequency component 204 that has been read from the buffer BF1L1, and outputs it to the inverse discrete wavelet transform unit IWT1L1. The inverse wavelet transform unit IWT1L1 reconstructs a layer L1 image signal. Then, the layer L1 image signal undergoes noise removal in the second noise removal unit NR1L1. Then, the image is subjected to correction in the correction unit CP1L1, and is output to the layer L0 inverse discrete wavelet transform unit IWT1L0.

In the layer L0, the image goes through processes similar to those in the layer L1 and is output from the correction unit CP1L0.

As seen above, a pipeline architecture is employed for noise removal and image correction in the respective layers so that each unit receives a signal that is output from the previous process, carries out its own process, and then outputs the signal to the subsequent process. To employ this pipeline architecture, each processing unit needs a line buffer.

Now provided are descriptions about how an image is input to the image processing unit 20 and about capacities of line buffers required for the respective processing units.

The image processing unit 20 receives pixels in units of a scanning line. FIG. 7 illustrates an example of an arrangement of an input image. The input image is configured by pixels contained in the scanning lines SL0 to SLn, where n is a positive integer. The discrete wavelet transform unit WT1L0 in FIG. 6 receives pixels in units of a scanning line. More specifically, pixels contained in the scanning lines SL0, SL1, . . . , and SLn are input to the discrete wavelet transform unit WT1L0 in the order mentioned. Line buffers LB1L0 to LB5L2 are buffers to store pixels in the scanning line direction (x direction in FIG. 7).

As mentioned above, a discrete wavelet transform separates an image signal into horizontal and vertical frequencies. A horizontal discrete wavelet transform requires information along the horizontal direction in an input image, but does not require pixels extending across a plurality of scanning lines. Referring to FIG. 7, frequency separation of pixels contained in the scanning line SL1 does not need pixels contained in the scanning lines SL2 to SLn.

To the contrary, a vertical discrete wavelet transform requires line buffers corresponding to a plurality of scanning lines. Referring to FIG. 7, a vertical discrete wavelet transform requires not only pixels contained in the scanning line SL1 but also pixels contained in the scanning lines SL2, SL3, and the like.

The number of lines of a buffer required for a vertical discrete wavelet transform depends on the basis function used for the transform. In other words, many line buffers are required for performing frequency separation precisely on an image signal. Accordingly, in order to perform a vertical discrete wavelet transform precisely, line buffers equivalent to a larger number of scanning lines must be made available.

Furthermore, line buffer capacities required for a layer may be different depending on the layer. Among the discrete wavelet transform units WT1L0 to WT1L2 for the respective layers, a higher layer transform unit handles a lower frequency component. This is because the low-frequency component handled in a lower layer (the layer L0, for example) is input to a higher layer (the layer L1, for example) discrete wavelet transform unit, which in turn handles a seemingly lower-resolution image. Assuming that the same basis function is used for all the discrete and inverse discrete wavelet transform units illustrated in FIG. 6, lower layers need larger-capacity line buffers. Note that descriptions about line buffers required for inverse discrete wavelet transforms are omitted because the required line buffer capacities are the same as those for discrete wavelet transforms.

What is needed for obtaining high quality images is to precisely perform frequency separation through every processing of discrete and inverse discrete wavelet transforms illustrated in FIG. 6. However, in this case every line buffer must have a large capacity due to the reasons above.

On the other hand, a larger number of lines in a line buffer may cause increased processing latency. A larger number of lines required for wavelet and inverse wavelet transforms also requires a greater amount of line input. Assuming that data is input at a constant speed, more precise frequency separation will result in more increased processing latency. An increase in processing latency in a higher layer involves expanded capacities of BF1L0 and BF1L1, which temporarily store high-frequency components in a lower layer. This expansion also contributes to a larger capacity of the memory 30 for the image processing device 1. That is, performing frequency separation precisely in every layer necessitates a larger capacity of the individual line buffers as well as the individual buffers to store high-frequency components, which in turn inevitably increases the capacity (size) of the memory 30 for the image processing device 1. As a result, the image processing device 1 would have a larger chip and be more expensive.

Furthermore, if external memory is used as the memory 30, the image processing device 1 would be connected to the external memory via a bus. Due to a limitation of a bus bandwidth, the throughput of the image processing device 1 may be determined by the data transfer capability of a bus depending on the amount of data exchanged between the external memory and the image processing device 1. In other words, a memory bandwidth can create a bottleneck in the image processing device 1.

As seen above, an expanded capacity required for a line buffer will be problematic irrespective of whether the memory 30 is implemented by internal or external memory.

To address this problem, an image processing device 2 with optimized capacities of required line buffers is proposed.

FIG. 8 illustrates an example of an internal configuration of an image processing unit 20a in the image processing device 2. The image processing unit 20a is different from the image processing unit 20 in that the basis function used for the layer L0 discrete wavelet transform unit WT1L0a and the layer L0 inverse discrete wavelet transform unit IWT1L0a is changed.

More specifically, the discrete wavelet transform unit WT1LOa and the inverse discrete wavelet transform unit IWT1L0a use a basis function for rougher frequency separation compared with the basis function used for the discrete wavelet transform unit WT1L0 and the inverse discrete wavelet transform unit IWT1L0. As described above, the required number of pixels in the vertical direction differs depending on the basis function. Thus, using a basis function for rougher frequency separation reduces capacities of line buffers required for the discrete wavelet transform unit WT1L0a and the inverse discrete wavelet transform unit IWT1L0a. That is, capacities of the line buffers LB1L0a and LB2L0a can be reduced. As a result, the total capacity of the memory 30 can be decreased.

Now the following describes why it is possible to change the basis function used for the layer L0 discrete wavelet transform unit WT1L0a and inverse discrete wavelet transform unit IWT1L0a.

The impact of noise removal and image correction exerted on a whole image is different between a higher layer (the layer L2, for example) and a lower layer (the layer L0, for example). Thus, an optimum capacity of a line buffer is determined taking into consideration the impact of noise removal and image correction exerted on a whole image on each layer as well as the line buffer capacity required for the noise removal and image correction.

As described above, in the layer L2, various noise removal processes (wavelet shrinkage, second noise removal) and image correction are performed on the low-frequency component 203 produced in the layer L1. Furthermore, an image is reconstructed from this signal (the layer L1 low-frequency component 203) which underwent these noise removal and image correction processes and from the layer L1 high-frequency component 204, and then the reconstructed image is subjected to noise removal and image correction. Accordingly, the noise removal and image correction in the layer L2 affect the noise removal and image correction in the layer L1. Similarly, the noise removal and image correction in the layer L1 affect the noise removal and image correction in the layer L0. That is, the noise removal and image correction in the layer L2 affect the noise removal and image correction in the layers L1 and L0.

It can be seen from the above that the processes in the highest layer exert the greatest impact on a whole image, whereas the processes in the lowest layer exert the least impact on a whole image.

Then, different basis functions for the respective wavelet transforms (discrete and inverse discrete wavelet transforms) are used to reduce capacities of required line buffers. Although in FIG. 8 the basis function for the wavelet transforms in the layer L0 is changed, the basis functions for the layer L1 and/or the layers L0 and L1 may be changed.

As described above, in consideration of the impact of noise removal and image correction exerted on a whole image in the respective layers, basis functions are selected for the individual discrete and inverse discrete wavelet transforms. As a result, the total capacity of the memory 30 can be reduced while the performance of noise removal and image correction is least affected. That is, in the case of internal memory, the chip in the image processing device 2 is made smaller; in the case of external memory, a memory bandwidth creates no bottleneck in determination of performance of the image processing device 2.

In the first and second exemplary embodiments, frequency separation methods (wavelet transform), noise removals (wavelet shrinkage, second noise removal), and image corrections (correction process) are described by way of example only, and are not intended to limit the present invention. Likewise, the exemplary embodiments describe frequency separation of an input image in three layers (the layers L0 to L2), but are not intended to limit this invention to the three-layer frequency separation of input images.

Operations of each individual unit in the image processing unit 20 can be implemented with hardware through mounting circuit components, i.e., large-scale integration (LSI) circuit or other hardware components. Alternatively, the operations can also be implemented with software through the steps of storing a program that provides the functions in a storage device, loading the program into main memory, and causing a CPU to execute the program.

The respective disclosures of the patent and other literatures cited above are incorporated by reference herein. Modifications and adjustments of exemplary embodiments and samples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and samples, respective elements of the respective drawings, and the like) are possible within the scope of the claims of the present invention. That is, the present invention clearly includes every type of transformation and modification that a person skilled in the art can realize according to the entire disclosure including the scope of the claims of the present invention and to technological concepts thereof. In particular, it should be understood that a range of values appearing herein includes any value and sub-range falling in the range as if they are specifically set forth herein unless otherwise stated.

REFERENCE SIGNS LIST 1-3, 100 Image processing device
10 Image input unit
20, 20a Image processing unit
30 Memory
40 Image output unit
101 First frequency separation unit
102 Second frequency separation unit
103 First image transform unit
104 Second image transform unit
201, 203, 205 Low-frequency component
202, 204, 206 High-frequency component
BF1L0, BF1L1 Buffer
CP1-CP3 Correction process
CPL0-CP1L2 Correction unit
IWT1-IWT3 Inverse discrete wavelet transform
IWT1L0-IWT2L2, IWT1L0a Inverse discrete wavelet transform unit
LB1L0-LB2L2, LB1L0a, LB2L0a Line buffer
NR1-NR3 Second noise removal
NR1L0-NR1L2 Second noise removal unit
WD1-WD3 Wavelet shrinkage
WD1L0-WD1L2 Wavelet shrinkage unit
WT1-WT3 Discrete wavelet transform
WT1L0-WT1L2, WT1L0a Discrete wavelet transform unit

What is claimed is:

1. An image processing device comprising:
   a first frequency separator, implemented by at least one hardware component, which receives an input image and performs frequency separation on the input image into a first low-frequency component and a first high-frequency component that includes a higher-frequency component than the first low-frequency component;
   a second frequency separator, implemented by at least one hardware component, which separates the first low-frequency component into a second low-frequency component and a second high-frequency component that includes a higher-frequency component than the second low-frequency component;
   a first image transformer, implemented by at least one hardware component, which performs noise removal on the second low-frequency component and on the second high-frequency component, and outputs a noise-removed image as a first transformed image; and
   a second image transformer, implemented by at least one hardware component, which performs noise removal on the first high-frequency component and on the first transformed image, with fewer resources allocated than those allocated to the first image transformer, and outputs a noise-removed image as a second transformed image;
   wherein the first frequency separator comprises a first wavelet transformer which performs a wavelet transform, and
   wherein the second frequency separator comprises a second wavelet transformer which performs a wavelet transform, and
   wherein the first image transformer comprises:
      a first wavelet shrinker, implemented by at least one hardware component, which compares a wavelet coefficient for the second high-frequency component with a first threshold value, and shrinks any wavelet coefficient that is smaller than the first threshold value; and
      a first inverse wavelet transformer, implemented by at least one hardware component, which reconstructs an image by performing an inverse wavelet transform on a signal that is output from the first wavelet shrinker and on the second low-frequency component,
   and wherein the second image transformer comprises:
      a second wavelet shrinker, implemented by at least one hardware component, which compares a wavelet coefficient for the first high-frequency component with a second threshold value, and shrinks any wavelet coefficient that is smaller than the second threshold value; and
      a second inverse wavelet transformer, implemented by at least one hardware component, which reconstructs an image by performing an inverse wavelet transform on a signal that is output from the second wavelet shrinker and on the first transformed image.

2. The image processing device according to claim 1, wherein a first basis function employed in the first wavelet transformer and the first inverse wavelet transformer is different from a second basis function employed in the second wavelet transformer and the second inverse wavelet transformer.

3. The image processing device according to claim 2, wherein the first wavelet transformer, the first inverse wavelet transformer, the second wavelet transformer, and the second inverse wavelet transformer each comprise a line buffer which stores pixels of the input image in a scanning direction,
   and wherein the first wavelet transformer and the first inverse wavelet transformer each comprise a first line buffer whose number of lines is less than that of a second line buffer which the second wavelet transformer and the second inverse wavelet transformer each comprise.

4. The image processing device according to claim 1, wherein the first and/or second image transformer comprises an image corrector which performs image correction on a noise-removed image.

5. The image processing device according to claim 1, wherein a pipeline architecture is configured by the first wavelet transformer, the first wavelet shrinker, the first inverse wavelet transformer, the second wavelet transformer, the second wavelet shrinker, and the second inverse wavelet transformer.

6. A method for processing an image, implemented by at least one processor, the method comprising:
   receiving an input image and performing frequency separation on the input image into a first low-frequency component and a first high-frequency component which includes a higher-frequency component than the first low-frequency component;

separating the first low-frequency component into a second low-frequency component and a second high-frequency component which includes a higher-frequency component than the second low-frequency component;

outputting a first transformed image by performing noise removal on the second low-frequency component and on the second high-frequency component; and outputting a second transformed image by performing noise removal on the first high-frequency component and on the first transformed image with resources fewer than those used for the outputting the first transformed image, wherein the performing frequency separation on the input image comprises performing a first wavelet transform, and wherein the separating the first low-frequency component comprises performing a second wavelet transform, and wherein the outputting the first transformed image comprises:
  comparing a wavelet coefficient for the second high-frequency component with a first threshold value, and shrinking any wavelet coefficient that is smaller than the first threshold value; and
  reconstructing an image by performing an inverse wavelet transform on a signal that is output after the shrinking any wavelet coefficient that is smaller than the first threshold value and on the second low-frequency component, and wherein the outputting the second transformed image comprises:
  comparing a wavelet coefficient for the first high-frequency component with a second threshold value, and shrinking any wavelet coefficient that is smaller than the second threshold value; and
  reconstructing an image by performing an inverse wavelet transform on a signal that is output after the shrinking any wavelet coefficient that is smaller than the second threshold value and on the first transformed image.

7. A non-transitory computer-readable medium with instructions stored thereon, that when executed by a processor, perform steps comprising:

receiving an input image and performing frequency separation on the input image into a first low-frequency component and a first high-frequency component which includes a higher-frequency component than the first low-frequency component;

separating the first low-frequency component into a second low-frequency component and a second high-frequency component which includes a higher-frequency component than the second low-frequency component;

outputting a first transformed image by performing noise removal on the second low-frequency component and on the second high-frequency component; and outputting a second transformed image by performing noise removal on the first high-frequency component and on the first transformed image with resources fewer than those used for the outputting the first transformed image, wherein the performing frequency separation on the input image comprises performing a first wavelet transform, and wherein the separating the first low-frequency component comprises performing a second wavelet transform, and wherein the outputting the first transformed image comprises:
  comparing a wavelet coefficient for the second high-frequency component with a first threshold value, and shrinking any wavelet coefficient that is smaller than the first threshold value; and
  reconstructing an image by performing an inverse wavelet transform on a signal that is output after the shrinking any wavelet coefficient that is smaller than the first threshold value and on the second low-frequency component, and wherein the outputting the second transformed image comprises:
  comparing a wavelet coefficient for the first high-frequency component with a second threshold value, and shrinking any wavelet coefficient that is smaller than the second threshold value; and
  reconstructing an image by performing an inverse wavelet transform on a signal that is output after the shrinking any wavelet coefficient that is smaller than the second threshold value and on the first transformed image.

* * * * *